United States Patent [19]

Hoke

[11] Patent Number: 5,297,830
[45] Date of Patent: Mar. 29, 1994

[54] AUTOMATIC LOAD SENSING VACUUM VALVE

[76] Inventor: Thomas A. Hoke, R.D. #2, Box 606, Red Lion, Pa. 17356

[21] Appl. No.: 42,885

[22] Filed: Apr. 5, 1993

[51] Int. Cl.$^5$ .............................................. B66C 1/02
[52] U.S. Cl. ..................................................... 294/65
[58] Field of Search ................. 294/64.1, 65; 248/362, 248/363; 269/21; 414/627, 737, 752

[56] References Cited

U.S. PATENT DOCUMENTS

| | | | |
|---|---|---|---|
| 715,905 | 12/1902 | Tuck et al. | 294/64.1 |
| 2,903,290 | 9/1959 | Morris et al. | 294/65 |
| 3,207,325 | 9/1965 | Whallon et al. | 294/64.1 X |
| 4,185,814 | 1/1980 | Buchmann et al. | 294/64.1 X |

FOREIGN PATENT DOCUMENTS

| | | | |
|---|---|---|---|
| 2146705 | 3/1973 | Fed. Rep. of Germany | 294/64.1 |
| 2629160 | 1/1978 | Fed. Rep. of Germany | 294/64.1 |
| 4123063 | 1/1993 | Fed. Rep. of Germany | 294/64.1 |
| 9011244 | 10/1990 | PCT Int'l Appl. | 294/64.1 |

*Primary Examiner*—Johnny D. Cherry
*Attorney, Agent, or Firm*—Charles J. Long

[57] ABSTRACT

A valve for vacuum lifting systems has a flow passage with a load end, a vacuum end, orifices at each end, and an air impermeable float member within the passage. The valve is positioned in the air flow path between a vacuum lifting pad and a vacuum pump, with its vacuum end in the direction of the pump and its load end in the direction of the pad. Activation of the vacuum pump creates an initial air flow which causes the float member to move at a determinable rate from a rest position at the load end toward the vacuum end. If the load end of the valve is open, activation of the pump causes the float member to form a vacuum seal with the interior wall of the flow passage at the vacuum end orifice. If the lifting pad is in operative contact with a suitable load surface, the length of the valve flow passage is such that on activation of the pump a vacuum seal will be formed between the load and the lifting pad before the float member reaches the vacuum end orifice. With multi-port lifting pads, valves of the invention function to prevent air flow through any vacuum port which is not in proper vacuum contact with the load surface. The load end orifice is configured to allow air flow from the flow passage through the orifice even when the float member is in its rest position, thereby allowing rapid release of vacuum from all ports at the completion of a lift.

10 Claims, 2 Drawing Sheets ns VACUUM VALVE

BACKGROUND OF THE INVENTION

1. Field of the Invention.

This invention relates to vacuum lifting systems. More particularly, the invention relates to an automatic sensing valve useful in multi-port vacuum pads for lifting operations involving loads of varying configurations and surface characteristics; in such use, the valve of my invention automatically blocks all ports except those ports resting on suitable surface areas, so that vacuum efficiency is maximized.

2. Description of the Prior Art.

Vacuum lifting systems are in common use as effective means to lift and/or position loads having "vacuum-friendly" surface characteristics—i.e. surfaces to which a vacuum pad will adhere under vacuum. Such systems normally include vacuum generating means such as a pump, often with an interconnected evacuated reservoir tank to sustain vacuum in the event of pump failure, one or more lifting pads so constructed as to form a vacuum seal with suitable load surfaces when vacuum is applied, and suitable vacuum conduit means, such as hoses, interconnecting the pad or pads with the vacuum pump. Each pad is suspended by one or more chains or the like from either a crane hook or a frame on which the vacuum pump is mounted, the frame in turn being suspended from a crane hook. In use each vacuum pad is lowered into position on the load surface, the vacuum pump is activated, and when a vacuum seal has been established between the pad and the load surface, the assembly is lifted. When the lifting operation is completed, the vacuum is released, either by means which simply allow atmospheric air to flow to the pad or, if more rapid release is desired, by means which actually blow air through the conduit and pad; in either event, when the vacuum is released, the pad and other parts of the assembly can be lifted away from the work.

As is known to those skilled in the art, the lifting capacity of a vacuum system is determined by several factors, including the capacity of the vacuum pump, number, size and configuration of vacuum pads, etc. The rate at which the design vacuum level is reached, which can be very important in high volume or high speed lifting operations, is determined by many of the same factors as capacity, but is also related to the rate of air flow permitted by the vacuum hoses, lifting pad orifices etc.; the higher the flow rate, the more rapidly design vacuum level can be reached. Vacuum pads of the prior art vary in size and shape (e.g. oval, square etc.) according to the type of load with which they are to be used. Additionally, most such pads have heretofore included a resilient sealing member around the periphery of their working surface—i.e. the surface facing the load surface—and a single orifice or port through which the working surface communicates with the hose to the vacuum pump.

New applications for vacuum lifting continue to arise as the effectiveness of the method is appreciated. One such application involves lifting in one operation a group of finished wooden floor boards or the like. In this situation a number of adjacent boards having typical widths of 2 to 3 inches and lengths of 8 to 12 feet are finished, e.g. by application of varnish, in one operation and emerge from the finishing equipment at one time, whereupon it is desired to lift the entire group as a unit and move them to a storage location. Although the finished surface of each such board is suitable for vacuum lifting, the unavoidable interstices between adjacent boards allows the flow of air, which prevents the formation of a vacuum seal if use is attempted of one of the above described prior art vacuum pads shaped to span the group of boards. Further compounding the problem is the fact that the group of boards to be lifted may vary in number and thus in combined width; hence, a prior art vacuum pad wide enough to span a particular number or width of boards will be unusable for lifting groups of fewer or narrower boards due to air leakage at the sides of the load.

Another lifting application where prior art vacuum pads cannot normally be used is one involving a load with varying surface characteristics, wherein some portions of the surface are suitable for forming a vacuum seal, while adjacent portions are not, for example because they contain depressions or holes.

One approach to overcoming problems such as those discussed has been to provide a vacuum pad in which the working face defines a plurality of spaced vacuum ports and a sealing member covering the entire working face includes holes corresponding to the ports, each port communicating with the vacuum hose through a manifold arrangement. In such prior art pads, a normally closed valve is mounted at each port and a sensing finger linked to the valve extends through the port and beyond the sealing member. If a sensing finger in a particular port is displaced by the load surface when the pad is brought in contact with the load, it causes the valve to open and thereby allows the vacuum pump to operate on that port with the intent of forming a vacuum seal at that part of the work surface.

Theoretically, with the just described multi-port vacuum pad, the vacuum pump will operate only on those ports in the working face where the sealing member is in contact with suitable load surface areas. However, two principal problems still exist with such a pad. First, the use and installation of the fingeroperated sensing valves adds significant expense and complexity to the pad. Second, the sensing fingers can be displaced by an isolated high point on the load surface or by the edge of a load adjacent to an open space; in either case, no seal is formed at such ports when the valve opens, and lifting either does not occur or is highly inefficient and unsafe because only a partially effective seal is formed between the vacuum pad and the load.

SUMMARY OF THE INVENTION

I have developed a valve especially useful with multi-port vacuum pads, although other uses will doubtless be apparent to those skilled in the art. My valve is simple in construction, does not require any extending sensing finger or similar member to contact the load surface, and functions automatically to prevent air flow through any vacuum port which is not in proper vacuum contact with the load surface.

In accordance with the broadest aspects of the invention, I provide, in a vacuum lifting system comprising vacuum generating means, a lifting member, and vacuum conduit means connecting the generating means and the lifting member, of the type wherein application of vacuum between the lifting member and a load having predetermined surface characteristics, the lifting member being in contact with the load surface, forms a vacuum seal which allows the load to be lifted, and release of the vacuum allows removal of the lifting member from the load, and wherein the vacuum generating means when activated cause a predetermined initial flow rate of air from the lifting member through the conduit means, which rate is reduced to effectively zero when the requisite vacuum seal has been established, and wherein said lifting member comprises a vacuum pad having at least one orifice communicating with the vacuum conduit means, said vacuum pad being so constructed and arranged as to form a vacuum seal with the load surface when vacuum is applied, the improvement comprising a valve positioned in the air flow path between the vacuum pad orifice and the vacuum generating means, said valve comprising a) a housing defining a flow passage having a load end in the direction of the vacuum pad, a vacuum end in the direction of the vacuum generating means, and an orifice at each of said ends; b) an air impermeable float member within the flow passage and freely moveable therein, the float member being larger than either of the two orifices whereby the float member is retained within the flow passage; c) means causing the float member to assume a rest position at the load end of the flow passage when vacuum is not being applied; d) the float member being of such density that the initial flow rate causes it to move from the rest position to the vacuum end of the flow passage at a predetermined rate of speed; e) the float member and vacuum end orifice being cooperatively configured such that when the float member engages the vacuum end orifice under the influence of the initial flow of air, they form a seal which stops further air flow through the valve in the direction of the vacuum end and thereby maintains the vacuum; f) the load end orifice being configured to allow air flow through the valve in the direction of the load end even when the float member is in its rest position; and g) the length of the flow passage being such that upon activation of the vacuum generating means with the vacuum pad in operative contact with the load surface, a vacuum seal will be formed between the vacuum pad and the load surface before the float member reaches and engages the vacuum end orifice.

In a preferred embodiment the vacuum end orifice is of substantially circular cross section, the float member is substantially spherical in shape, and the surface of at least one of the float member and the flow passage interior wall at the vacuum end orifice is sufficiently resilient to cause the float member to sealingly conform to the passage wall at the vacuum end orifice under the influence of vacuum.

Preferably, the flow passage is substantially cylindrical in shape.

For adaptability to varying vacuum systems, the length of the flow passage may be adjustable, whereby different initial air flow rates can be accommodated.

In an especially useful embodiment, the housing is constructed in two pieces, a first piece having an internally threaded bore at one end and one of the vacuum end and load end at the other end, and a second piece having one end externally threaded to sealingly mate with the internal threads on the first piece and having the other of the vacuum end and load end at its other end, the flow passage being defined when the two pieces are threaded together, whereby the length of the flow passage can be varied by screwing the second piece into first piece to varying extent. To hold the set flow passage length, the valve preferably includes a lock nut threaded onto the external threads of the second piece, whereby the second piece can be locked into a selected axial position with respect to the first piece.

Preferably, the load end orifice configuration includes an axially centered cylindrical hole extending from the flow passage to the exterior of the valve body, a bevelled shoulder extending part way around the cylindrical hole at the interior end thereof, and an axially eccentric cylindrical relief depression formed in the valve body at the interior end of said cylindrical hole, the axis of the relief depression being parallel to the axis of said cylindrical hole, the inner wall of the relief depression being tangent to the inner wall of said cylindrical hole at one point on the circumference thereof, the relief depression depth being from the axial level of the radially outward end of the bevelled shoulder to a point past the axial level of the radially inward end of said shoulder, whereby when the spherical float member is resting at the load end of the flow passage, the bevelled shoulder and relief depression provide a channel for air flow around the float member from the flow passage through the load end orifice.

In the most common application environments, the means causing the float member to assume a rest position at the load end of the flow passage preferably comprise means for mounting the valve with its longitudinal axis in a substantially vertical orientation with the load end being at the bottom of the valve and the vacuum end at the top, whereby the float member is maintained in its rest position by the force of gravity.

In one current embodiment, the valve housing is formed from aluminum alloy and the float member is formed from acetal.

other details, objects and advantages of the invention will become apparent as the following description of a certain present preferred embodiment thereof proceeds.

BRIEF DESCRIPTION OF THE DRAWINGS

In the accompanying drawings I have shown a certain present preferred embodiment of the invention in which.

DESCRIPTION OF THE PREFERRED EMBODIMENT

Figure 1:
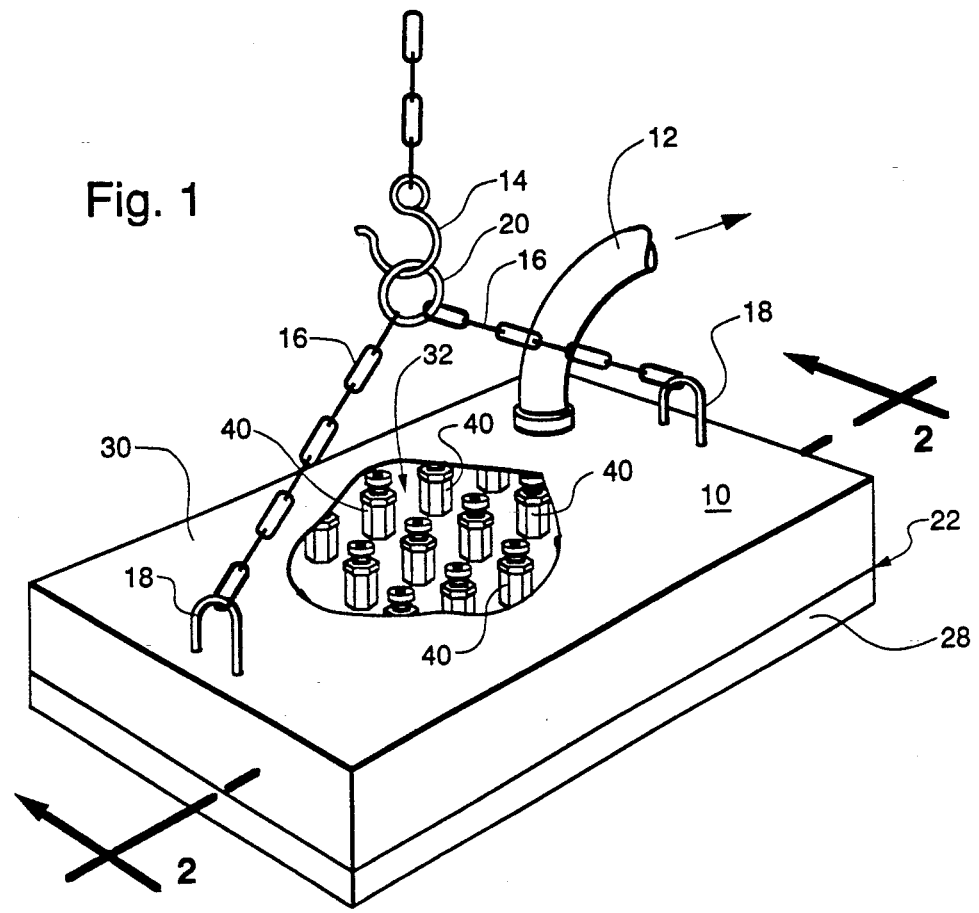
FIG. 1 is a simplified perspective view of a vacuum lifting pad with a portion of the top wall cut away to show one arrangement of valves according to the invention.
Figure 2:
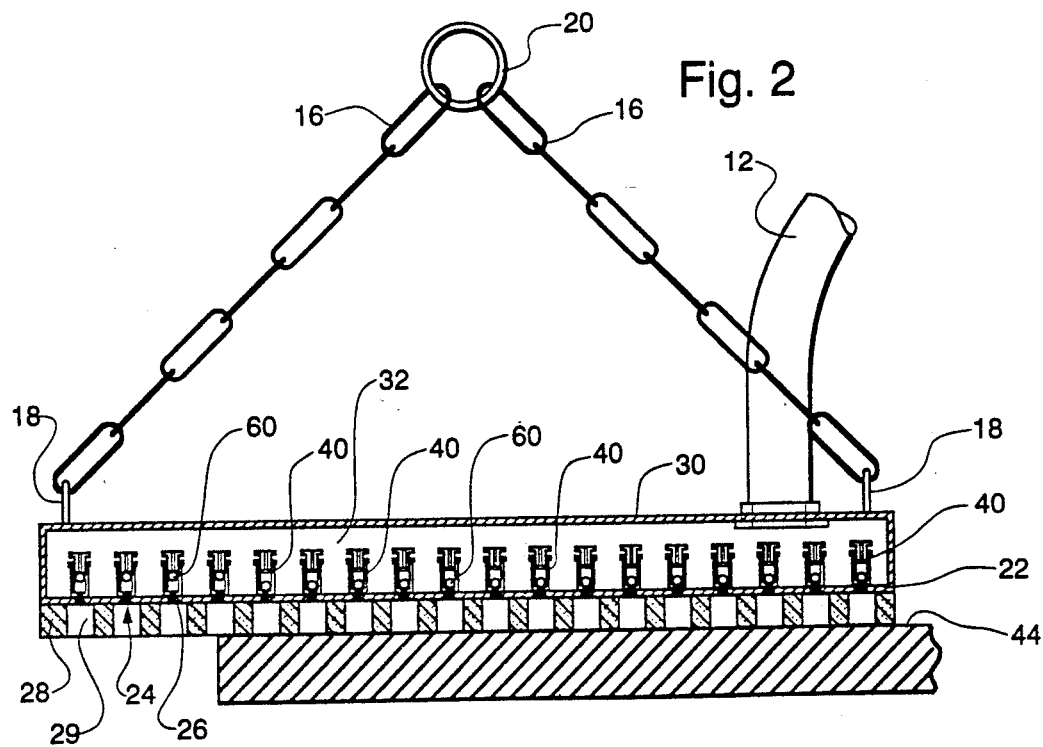
FIG. 2 is a sectional view taken on the line 2—2 of FIG. 1, with the lifting pad in operative vacuum contact with a load to be lifted and illustrating two operational modes of valves according to the invention.

Turning first to FIGS. 1 and 2, my invention is used in a vacuum lifting system comprising vacuum generating means, not shown, but normally comprising a vacuum pump of known type, a lifting member comprising a vacuum pad shown generally as 10, and vacuum conduit means 12, typically a vacuum hose, connecting the generating means the lifting member. The vacuum pad is suspended from a crane hook 14 by chains 16 connecting U brackets 18 at the vacuum pad ends to a ring 20 engaged by the hook. Vacuum pad 10 comprises a bottom wall 22, the bottom surface of which forms a working face 24. The bottom wall has a plurality of orifices or vacuum ports 26, and the working face 22 is covered by a sealing member 28 which is formed with holes in registry with the vacuum ports. The bottom wall and the other walls of the vacuum pad form a manifold 30, the chamber 32 of which is connected by the vacuum hose 12 to the vacuum pump.

Valves 40 according to the invention are mounted in the interior of the manifold chamber at each of the vacuum ports—i.e. in the air flow path between the vacuum pad orifice and the vacuum pump. When the working face and sealing member are in operative position on a load surface, activation of the vacuum pump causes it to draw air through the vacuum ports 26 and valves 40 into the manifold 32 and through the vacuum hose 12 until the requisite vacuum seal has been established, at which time air flow through the vacuum ports becomes effectively zero, although the pump continues to operate to maintain the vacuum.

As above indicated, the vacuum pump may be of a type commonly used in vacuum lifting; it, along with the vacuum hose and sealing member, are normal components of vacuum lifting systems, selection of which is well within the skill of the art. A typical vacuum pump may have a capacity of 125 cubic feet per minute (cfm) and capacities of from 75 to 1,000 cfm are available. The pump capacity defines the initial air flow rate through the system when the pump is activated; in the embodiment shown, such initial flow rate through each of the valves 40 is, of course, only a fraction of the pump rate, the aggregate flow through all valves being equal to the flow through the pump.

In FIG. 2 the vacuum pad has been positioned on a load 44 which is shaped such that it is sealingly engaged by only a portion of the vacuum ports. At its left end, viewing FIG. 2, the load extends only partially across one port and the remaining ports to the left of the load are completely open to the air.

Figure 3:
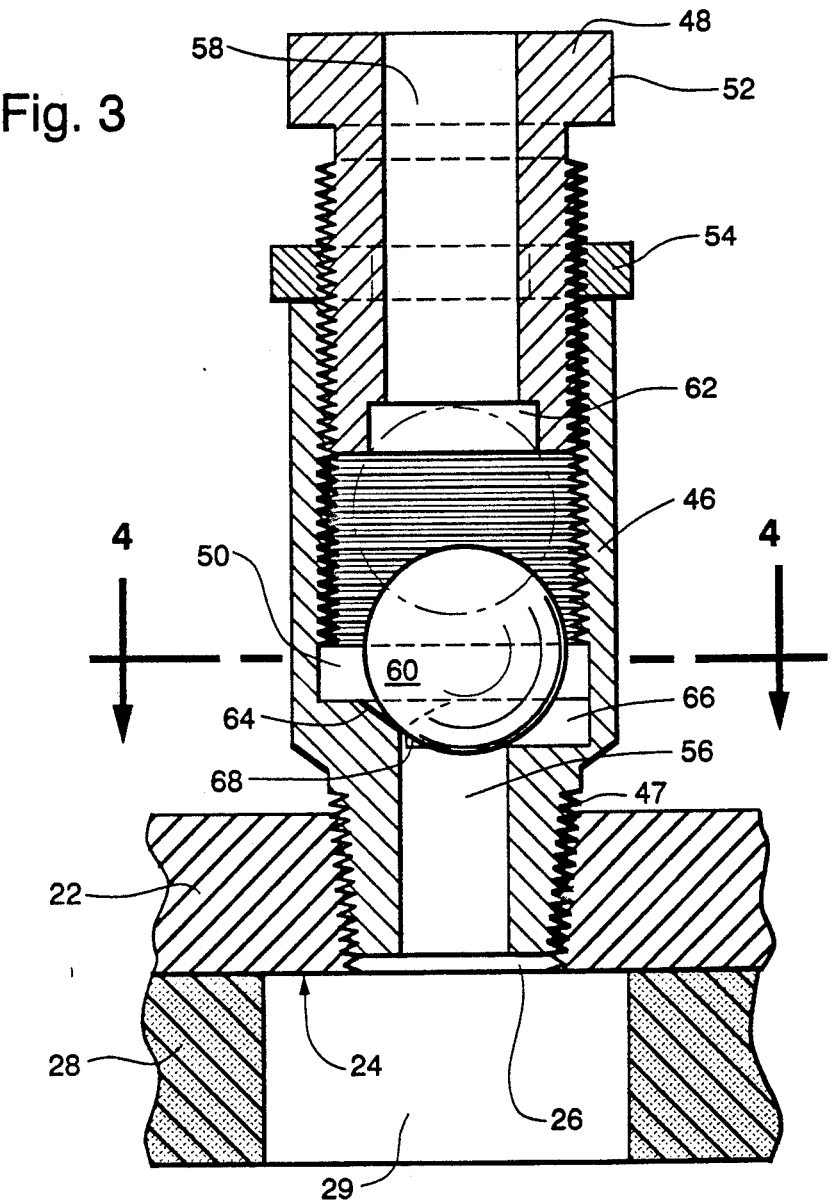
FIG. 3 is a close up sectional view of one of the valves of FIG. 2 and the adjacent portion of the lifting pad.

FIG. 3 shows a sectional view of one of the valves 40 shown in FIG. 2. The valve, which is preferably made from an aluminum alloy such as 6061T6, comprises a housing constructed in two pieces, a lower piece 46 and an upper piece 48. The exterior shape of the lower piece 46 may be hexagonal to allow use of a wrench to tighten the valve in position, although other shapes may be used. At its lower end 47, the valve is externally threaded with pipe threads and is screwed into a vacuum port 26 which has been tapped with like threads. Also shown in FIG. 3 is the sealing member 28 with its hole 29 in registry with the vacuum port.

A cylindrical cavity 50 formed in the lower piece 46 of the valve is internally threaded in its upper portion. The lower portion of the upper piece 48 is also cylindrical and is sized and externally threaded to sealingly mate with the threads in the lower piece 46. An enlarged flange 52, preferably knurled, at the top of the upper piece allows it to be turned into the lower piece to a desired extent, and a hexagonal lock nut 54 threaded onto the upper piece provides means for locking the upper piece in a selected axial position with respect to the lower piece.

With the upper piece 48 threaded into the lower piece 46, the valve housing defines a cylindrical flow passage the length of which can be varied by changing the extent to which the pieces are threaded together. Viewing FIG. 3, the lower end of the flow passage is its load end and the upper end is its vacuum end. The load end of the passage communicates with the vacuum port 26 through load end orifice 56, cylindrical and coaxial with the flow passage over most of its length, formed in the lower piece 46. Similarly, the vacuum end of the flow passage communicates with the manifold through vacuum end orifice 58, also generally cylindrical and coaxial with the flow passage, formed in the upper piece 48.

Positioned within the flow passage is an air impermeable float member 60. In the preferred embodiment shown, the float member is spherical and is formed from acetal (sold by DuPont as DEIRIN ®). The diameter of float member 60 is larger than either of the load end and vacuum end orifices so it is retained within the flow passage; however, it is small enough to be freely moveable within the flow passage.

The relative diameters of float member 60 and the interior end 62 of the vacuum end orifice 58 are selected such that given the slight resiliency of acetal compared with the hardness of the aluminum alloy forming the valve housing, the float member will sealingly engage the upper wall of the flow passage at the vacuum end orifice under the influence of vacuum, to thereby maintain the vacuum. In the embodiment shown, the diameter of the vacuum end orifice, which is constant over most of its length, is enlarged over a short distance at the interior end 62 to provide better sealing between the float member and the flow passage wall at the orifice. In FIG. 3 the float member 60 is shown in broken lines in the position at which it forms a seal with the flow passage wall.

Figure 4:
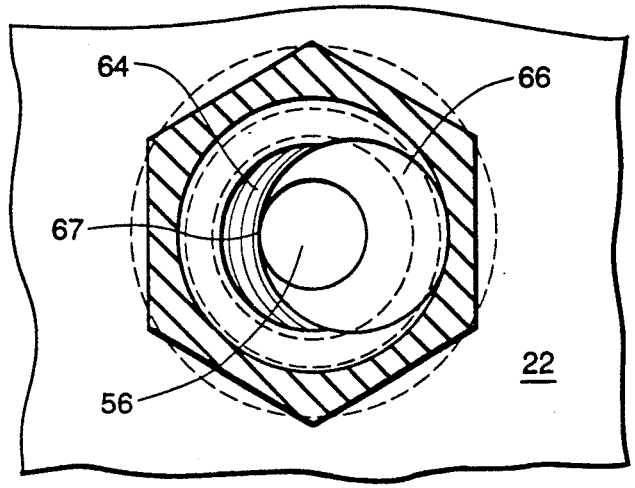
FIG. 4 is a sectional view taken on the line 4—4 of FIG. 3 but with the spherical float member omitted so that the interior structure of the valve body can be seen.

A preferred configuration of the load end orifice for allowing air flow through the valve in the direction of the load end when the float member 60 is at its rest position at the load end of the flow passage is shown in FIGS. 3 and 4. The load end orifice is initially formed as a straight cylindrical bore extending from the exterior of the valve to the flow passage. At the flow passage end of the orifice the housing is then countersunk to form a short bevelled shoulder 64. Following the countersinking an axially eccentric cylindrical relief depression 66, having a diameter between that of the cylindrical bore and that of the flow passage and with its inner wall tangent to the inner wall of the cylindrical bore at one point 67 on its circumference, is formed, for example by end milling, to a depth slightly greater than the depth of the bevelled shoulder 64. As is partially visible in FIG. 3, such configuration provides a channel 68 for air flow around the float member when the float member is resting at the load end of the flow passage.

For proper and consistent functioning of a valve according to the invention, it is necessary that means be provided to cause the float member to assume its rest position when vacuum is not being applied. Properly chosen linear springs of known types can be used for this function, and are required if, for example, the valve is positioned with its flow passage axis more nearly horizontal than vertical. However, in most vacuum lifting applications the working face of the lifting pad is horizontal and the valve is mounted as shown in FIGS. 1 through 3—i.e. with its flow passage axis generally vertical; in such orientation the force of gravity serves without more to cause the float member to assume its rest position when vacuum is not being applied.

In using a lifting pad with valves of the invention installed as shown in FIGS. 1 through 3, each valve must be individually "tuned" for proper effectiveness. By "tuning" is meant that the length of the flow passage must be adjusted to a point where, upon activation of the vacuum pump with that valve's corresponding vacuum port in operative contact with a load surface, a vacuum seal will be formed at the load end—i.e. between the vacuum port and the load surface—before the float member reaches and engages the vacuum end orifice under the influence of the initial air flow rate. The "tuning" step can readily be mastered by those skilled in vacuum lifting, and should normally be accomplished easily.

The condition of a series of properly "tuned" valves after activation of the vacuum pump is illustrated in FIG. 2. It can there be seen that in the first three valves from the left, where no part of the load 44 is contacted by their vacuum ports, and in the fourth valve from the left where the load surface only partially blocks the vacuum port, the initial air flow rate pulled the float members 60 to the vacuum ends of the flow passages and caused the formation of seals preventing air flow through the valves. The remainder of the valves in FIG. 2 are mounted in vacuum ports which are in proper operative contact with the surface of the load 44; with these valves, activation of the vacuum pump caused formation of vacuum at the port/surface interfaces before the float members reached the vacuum ends of the valves, whereupon the float members simply fell back to their rest positions under the influence of gravity.

On release of the vacuum by bleeding or forcing air into the manifold 40, the float members of the four valves to the left in FIG. 3 will return to their rest positions, the float members in the remaining valves will, of course, remain in their rest positions, and air will flow from the manifold out through the vacuum ports via the channels, 68 in FIG. 3, formed in the load end orifices of the valves.

As above mentioned, I prefer to use an aluminum alloy such as 6061T6 for the housing of my valve, because of its light weight and machinability. However, other materials such as other alloys and certain plastics could also be used for the valve housing. Similarly, although I prefer using acetal for the spherical float member in my valve because of its ready availability, light weight, and ability to form a vacuum seal with the aluminum alloy housing at the valve's vacuum end orifice in the preferred embodiment, other air-impermeable materials could be used, the important factor in selection being that the initial air flow upon activating the vacuum pump be sufficient to move the float member from its rest position into sealing engagement with the vacuum end orifice in a determinable brief time interval. Selection of such alternate materials for use in valves according to the invention is believed to be within the existing skill of the art.

With regard to dimensional considerations, the following listed dimensions and other characteristics apply to one valve embodiment of the type shown in FIG. 3:

Valve Body—6061T6 Aluminum Alloy

Lower piece 46
 Overall length: 1¾ inches
 Length of threaded bottom section 47: ½ inch
 Exterior width across hexagonal flats: ⅞ inch
 Inside diameter of cavity 50: ¾ inch
 Depth of cavity 50: 1¼ inches
 Depth of threaded portion of cavity 50: 13/16 inch
 Inside diameter of load end orifice 56 at bottom end of valve: ⅜ inch
 Depth of bevelled shoulder 64: 3/32 inches (0.094 inches)
 Depth of relief depression 66: 0.100 inch
 Diameter of relief depression 66: ½ inch Upper Piece 48
 Overall length: 1⅛ inches
 Threaded length: 9/16 inch
 Outside diameter of threaded portion: ¾ inch
 Inside diameter of vacuum end orifice 58 at top end of valve: ⅜ inch
 Inside diameter of vacuum end orifice at interior end 62: ½ inch
 Depth of enlarged portion of vacuum end orifice: ⅝ inch Lock Nut 54
 Width across flats: 1 inch
 Thickness: ¼ inch Mating threads on upper and lower pieces and lock nut; machine threads, 16 per inch Threads on bottom section 47: American National Taper Pipe thread Approximate range of flow passage length adjustments: ¾ inch to 1 1/16 inches Float Member 60—Acetal, ⅝ inch diameter sphere Other dimensions and shapes may obviously also be used in making valves according the invention.

While I have shown and described a certain present preferred embodiment of the invention, it is to be distinctly understood that the invention is not limited thereto, but may be otherwise variously embodied within the scope of the following claims.

I claim:

1. A vacuum lifting system for use in lifting a load with predetermined surface characteristics, comprising:
  a) a vacuum pad comprising a plurality of walls sealingly joined to form a manifold chamber having an outlet port formed in one of said walls and a plurality of vacuum ports formed in a second of said walls, the outer surface of said second wall being covered with a sealing member formed with ports in registry with said vacuum ports, the properties of the sealing member being such that when the sealing member around any of said ports is in contact with the load surface a vacuum seal can be formed and held at that port;
  b) vacuum generating means; and
  c) a vacuum conduit having two ends, one end being connected to the vacuum generating means and the other end being connected to said outlet port in said vacuum pad wall, the vacuum generating means, when activated, causing air to flow along an air flow path from the vacuum ports through the manifold chamber and vacuum conduit at a predetermined initial flow rate, the flow rate dropping to effectively zero when a vacuum seal is established at the vacuum ports,
  wherein the improvement comprises a plurality of valves mounted within the manifold chamber, one valve being attached to the manifold chamber wall at each vacuum port in the air flow path between the vacuum port and the vacuum conduit, each valve comprising:
  d) a housing defining a flow passage having an interior wall, a load end in the direction of the vacuum port, a vacuum end in the direction of the vacuum conduit, and an orifice at each of said ends;
  e) an air impermeable float member within the flow passage and freely moveable therein, the float member being larger than either of the vacuum end and load end orifices, whereby the float member is retained within the flow passage;

f) means causing the float member to assume a rest position at the load end of the flow passage when vacuum is not being applied;

g) the float member being of such density that air flow along the air flow path at the initial flow rate causes it to move from the rest position to the vacuum end of the flow passage at a predetermined rate of speed;

h) the float member and vacuum end orifice being cooperatively configured such that when the float member engages the vacuum end orifice under the influence of air flow toward the vacuum end at the initial flow rate they form a seal which stops further air flow through the valve in the direction of the vacuum end to thereby maintain a vacuum;

i) the load end orifice having a configuration which allows air flow through the valve in the direction of the load end even when the float member is in its rest position; and j) means for varying the length between the load end and the vacuum end of the flow passage, whereby for a given initial flow rate said length can be adjusted to a value such that when the sealing member around the vacuum port at which the valve is attached is in operative contact with the load surface, activation of the vacuum generating means will result in formation of a vacuum seal between the sealing member and the load surface before the float member reaches and engages the vacuum end orifice.

2. A vacuum lifting system as claimed in claim 1 in which in each valve the vacuum end orifice is of substantially circular cross section, the float member is substantially spherical in shape, and the surface of at least one of the float member and the flow passage interior wall at the vacuum end orifice is sufficiently resilient to cause the float member to sealingly conform to the flow passage interior wall at the vacuum end orifice under the influence of vacuum.

3. A vacuum lifting system as claimed in claim 2 in which the flow passage of each valve is substantially cylindrical in shape.

4. A vacuum lifting system as claimed in claim 3 in which the housing of each valve is constructed in two pieces, a first piece having an internally threaded bore at one end and one of the vacuum end and load end at the other end, and a second piece having one end externally threaded to sealingly mate with the internal threads on the first piece and having the other of the vacuum end and load end at its other end, the flow passage being defined when the two pieces are threaded together, whereby the length between the load end and the vacuum end of the flow passage can be varied by screwing the second piece into the first piece to varying extents.

5. A vacuum lifting system as claimed in claim 4 in which the load end orifice configuration of each valve includes an axially centered cylindrical hole extending from the flow passage to the exterior of the valve body, a bevelled shoulder extending part way around the cylindrical hole at the interior end thereof, and an axially eccentric cylindrical relief depression formed in the valve body at the interior end of said cylindrical hole, the axis of the relief depression being parallel to the axis of said cylindrical hole, the inner wall of the relief depression being tangent to the inner wall of said cylindrical hole at one point on the circumference thereof, the relief depression depth being from the axial level of the radially outward end of the bevelled shoulder to a point past the axial level of the radially inward end of said shoulder, whereby when the spherical float member is resting at the load end of the flow passage, the bevelled shoulder and relief depression provide a channel for air flow around the float member from the flow passage through the load end orifice.

6. A vacuum lifting system as claimed in claim 5 further including a lock nut threaded onto the external threads of the second piece of each valve, whereby the second piece can be locked into a selected axial position with respect to the first piece.

7. A vacuum lifting system comprising vacuum generating means, a lifting member, and vacuum conduit means connecting the vacuum generating means and the lifting member, the lifting member comprising a vacuum pad having a plurality of orifices communicating with the vacuum conduit means and being so constructed and arranged that when the vacuum pad is in contact with a load surface of predetermined characteristics, application of vacuum causes a vacuum seal to be formed with the load surface at each pad orifice which is fully covered by the load surface, the vacuum generating means when activated causing a predetermined initial flow rate of air along a flow path from the vacuum pad orifices through the vacuum conduit means, which rate is reduced to effectively zero when a vacuum seal has been established, wherein the improvement comprises a valve positioned at each vacuum pad orifice in the air flow path from that orifice to the vacuum conduit means, each said valve comprising:

a) a two-piece housing defining a substantially cylindrical flow passage having an interior wall, a load end in the direction of the vacuum pad orifice, a vacuum end in the direction of the vacuum conduit means, and an orifice at each of said ends, one piece of the housing having an internally threaded bore at one end and one of the vacuum end and load end at the other end, the second piece of the housing having one end externally threaded to sealingly mate with the internal threads on the first piece and having the other of the vacuum end and load end at its other end, the flow passage being defined when the two pieces are threaded together, whereby the length of the flow passage can be adjusted by screwing the second piece into the first piece to varying extents, the orifice at the vacuum end being substantially circular in cross section, the orifice at the load end being configured to include an axially centered cylindrical hole extending from the flow passage to the exterior of the valve body, a bevelled shoulder extending part way around the cylindrical hole at the interior end thereof, and an axially eccentric cylindrical relief depression formed in the valve body at the interior end of said cylindrical hole, the axis of the relief depression being parallel to the axis of said cylindrical hole, the inner wall of the relief depression being tangent to the inner wall of said cylindrical hole at one point on the circumference thereof, the relief depression depth being from the axial level of the radially outward end of the bevelled shoulder to a point past the axial level of the radially inward end of said shoulder;

b) a substantially spherical air impermeable float member within the flow passage and freely movable therein, the float member being larger than either of the vacuum end and load end orifices, the diameter of the float member being such that when the float member rests at the load end of the flow passage the bevelled shoulder and relief depression of the load end orifice configuration provide a channel for air flow around the float member from the flow passage through the load end orifice;

c) means causing the float member to assume a rest position at the load end of the flow passage when vacuum is not being applied;

d) the float member being of such density that the initial flow rate of air upon activation of the vacuum generating means causes the float member to move from the rest position to the vacuum end of the flow passage at a predetermined rate of speed;

e) the surface of at least one of the float member and the flow passage interior wall at the vacuum end orifice being sufficiently resilient, and the vacuum end orifice being so configured, that when the float member engages the vacuum end orifice under the influence of the initial flow rate of air the float member sealingly conforms to the flow passage interior wall at the vacuum end orifice to stop further air flow through the valve in the direction of the vacuum end and thereby maintain the vacuum; and f) the length of the flow passage being adjusted such that upon activation of the vacuum generating means with a vacuum pad orifice contacting and fully covered by the load surface a vacuum seal will be formed at that vacuum pad orifice before the float member reaches and engages the vacuum end orifice of the valve.

8. A vacuum lifting system as claimed in claim 7 in which each valve further includes a lock nut threaded onto the external threads of the second piece whereby the second piece can be locked into a selected axial position with respect to the first piece.

9. A vacuum lifting system as claimed in any of claims 1-8 in which for each valve the means causing the float member to assume a rest position at the load end of the flow passage comprise means for mounting the valve with its longitudinal axis in a substantially vertical orientation with the load end being at the bottom of the valve and the vacuum end at the top, whereby the float member is maintained in its rest position by the force of gravity.

10. A vacuum lifting system as claimed in claim 9 in which for each valve the housing is formed from aluminum alloy and the float member is formed from acetal.

* * * * *